(12) United States Patent
Ochiai et al.

(10) Patent No.: US 10,709,122 B1
(45) Date of Patent: Jul. 14, 2020

(54) SPINNING REEL

(71) Applicant: Shimano Inc., Sakai, Osaka (JP)

(72) Inventors: Koji Ochiai, Osaka (JP); Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/689,863

(22) Filed: Nov. 20, 2019

(30) Foreign Application Priority Data

Dec. 27, 2018 (JP) .................................. 2018-244548

(51) Int. Cl.
*A01K 89/01* (2006.01)
*A01K 89/015* (2006.01)

(52) U.S. Cl.
CPC ................................ *A01K 89/0176* (2015.05)

(58) Field of Classification Search
CPC ........ A01K 89/01081; A01K 89/01082; A01K 89/01083; A01K 89/01084
See application file for complete search history.

(56) References Cited

U.S. PATENT DOCUMENTS

| | | | | |
|---|---|---|---|---|
| 5,273,233 A * | 12/1993 | Sugawara | ........ | A01K 89/01083 242/232 |
| 5,683,049 A * | 11/1997 | Kawabe | ........... | A01K 89/01083 242/232 |
| 6,382,542 B1 * | 5/2002 | Sato | ....................... | A01K 89/01 242/232 |
| 6,609,670 B2 * | 8/2003 | Sato | ................... | A01K 89/0108 242/231 |
| 6,644,578 B2 * | 11/2003 | Hong | ................ | A01K 89/0108 242/231 |
| 6,729,568 B2 * | 5/2004 | Hirayama | .......... | A01K 89/0108 242/232 |
| 6,766,974 B2 * | 7/2004 | Chang | ................ | A01K 89/0108 242/231 |
| 9,320,266 B2 * | 4/2016 | Hui | ................... | A01K 89/01082 |
| 9,706,761 B1 * | 7/2017 | Ochiai | ............. | A01K 89/01083 |
| 9,770,016 B2 * | 9/2017 | Chan | ..................... | A01K 89/00 |
| 2001/0032901 A1 * | 10/2001 | Sato | ................. | A01K 89/01083 242/232 |
| 2003/0116666 A1 * | 6/2003 | Takikura | .......... | A01K 89/01083 242/232 |
| 2003/0146319 A1 * | 8/2003 | Iwabuchi | ......... | A01K 89/01083 242/231 |
| 2008/0308663 A1 * | 12/2008 | Hiraoka | ............. | A01K 89/0108 242/233 |
| 2010/0187345 A1 * | 7/2010 | Hiraoka | ............. | A01K 89/0108 242/230 |

FOREIGN PATENT DOCUMENTS

EP 1415534 A1 * 5/2004 ....... A01K 89/01083
JP 5866275 B2 2/2016

* cited by examiner

*Primary Examiner* — Emmanuel M Marcelo
(74) *Attorney, Agent, or Firm* — Global IP Counselors, LLP

(57) ABSTRACT

A spinning reel includes a reel body, a rotor, a bail arm and a bail reversing mechanism. The rotor is rotatable relative to the rotor body. The bail arm is pivotable with respect to the rotor. The bail reversing mechanism has a pressing part configured to be capable of pressing the bail arm to swing the bail arm, a biasing part configured to bias the pressing part, a housing part disposed in the rotor and housing the biasing part, and a guide part housed in the housing part and configured to guide the biasing part between the pressing part and the housing part.

4 Claims, 6 Drawing Sheets

SPINNING REEL

CROSS-REFERENCE TO RELATED APPLICATIONS

This application claims priority to Japanese Patent Application No. 2018-244548, filed on Dec. 27, 2018. The entire disclosure of Japanese Patent Application No. 2018-244548 is hereby incorporated herein by reference.

BACKGROUND

Field of the Invention

The present invention relates to a spinning reel.

Background Art

A conventional spinning reel that include a bail reversing mechanism has been disclosed (refer to Japanese Patent Number 5866275). In the conventional bail reversing mechanism, an end portion of an elastic member (biasing part) is disposed outside of a swing member, and another portion of the elastic member (biasing part) is disposed in a housing hole of the swing member. The end portion of the elastic member (biasing part) biases the connecting member. In this state, by swinging the swing member and using the elastic member (biasing part) to press the bail arm against the connecting member, the attitude of the bail arm changes from either the line-winding attitude or the casting (line-releasing) attitude, to the other attitude, i.e., the casting attitude or the line-winding attitude.

In the conventional bail reversing mechanism, since the end portion of the elastic member (biasing part) is disposed outside the housing hole of the swing member, when the attitude of the bail arm is changed, there is the risk that the elastic member (biasing part) will slide against an open end of the housing hole of the swing member. In particular, if a coil spring is used as the elastic member (biasing part), when the coil spring is compressed, there is the risk that the peripheral end of the coil spring will expand and slide against or contact the open end of the housing hole of the swing member. Furthermore, there is the possibility that, when pressed, an end portion of a rod of a toggle portion will slide against or contact the inner periphery of the housing hole of the swing member. In such a situation, the elastic member (biasing part) may unevenly slide on the inner circumferential surface of the housing hole of the swing member. That is, in the conventional bail reversing mechanism, since the sliding resistance of the elastic member (biasing part) with respect to the swing member is not stable, there is the possibility that the attitude of the bail arm cannot be smoothly changed.

SUMMARY

The present invention was made in light of the above-described problem, and the object of the present invention is to provide a spinning reel with which the attitude of the bail arm can be smoothly changed.

A spinning reel according to one aspect of the present invention comprises a reel body, a rotor, a bail arm, and a bail reversing mechanism. The rotor is disposed so as to be rotatable relative to the rotor body. The bail arm is configured to be pivotable with respect to the rotor.

The bail reversing mechanism has a pressing part, a biasing part, a housing part, and a guide part. The pressing part is configured to be capable of pressing the bail arm to swing the bail arm. The biasing part biases the pressing part. The housing part is provided in the rotor. The biasing part is housed in the housing part. The guide part is housed in the housing part. The guide part operates the biasing part between the pressing part and the housing part.

In the present spinning reel, the biasing part and the guide part are housed in the housing part. In this state, the guide part guides the biasing part between the pressing part and the housing part. In this manner, since the biasing part is housed inside the housing part and guided by the guide part between the pressing part and the housing part, it is possible to prevent the biasing part from sliding against or contacting the open end of the housing part and to reduce changes in the sliding resistance or the contact resistance. That is, the attitude of the bail arm can be changed smoothly.

In the fishing reel according to another aspect of the present invention, the housing part preferably has a housing hole for disposing the biasing part. In this embodiment, the guide part has a sliding portion that slides along the housing hole.

Thus, by sliding the sliding portion of the guide part along the housing hole, changes in the sliding resistance of the biasing part and the housing part can be suitably reduced. In addition, it is also possible to restrict the sliding of the end portion of the biasing part and the open end of the housing hole of the housing part with the guide part.

In the fishing reel according to another aspect of the present invention, the pressing part preferably has a pressed portion that is pressed by the biasing part via the guide part. In this embodiment, at least part of the pressed portion is disposed in the housing part.

In this configuration, the pressing part (pressed portion) is pressed by the biasing part via the guide part. Here, the guide part is housed in the housing part, and at least a portion of the pressed portion is disposed in the housing part. It is thereby possible to suitably guide the biasing part between the pressing part and the housing part with the guide part. In addition, since the attitude of the guide part (rod) can be stabilized, it is possible to suitably reduce changes in the sliding resistance or the contact resistance of the biasing part and the housing part without sliding or contacting the guide part with the housing part.

In the fishing reel according to another aspect of the present invention, the biasing part is preferably a coil spring. In this embodiment, the guide part has a guide hole through which the pressing part can be inserted. A portion of the pressing part is disposed in the inner peripheral portion of the coil spring via the guide hole.

In this configuration, since a portion of the pressing part is disposed in the inner peripheral portion of the coil spring, it is possible to prevent the deflection (bending, falling, etc.) of the coil spring. That is, it is possible to suitably reduce changes in the sliding resistance of the biasing part and the housing part.

According to the present invention, the attitude of the bail arm of a spinning reel can be smoothly changed.

DETAILED DESCRIPTION OF EMBODIMENTS

Figure 1:
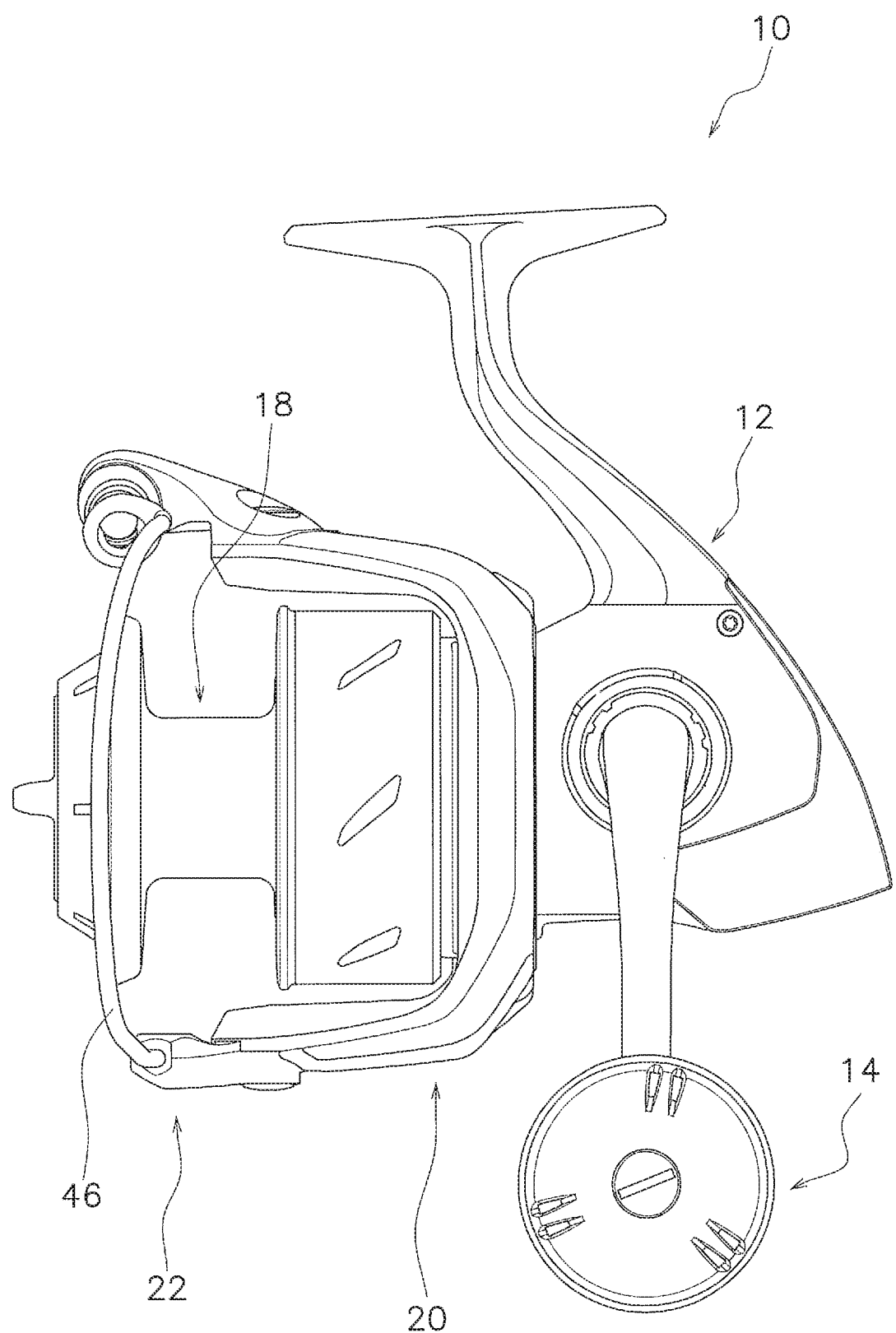
FIG. 1 is a side view of a spinning reel employing one embodiment of the present invention.
Figure 2:
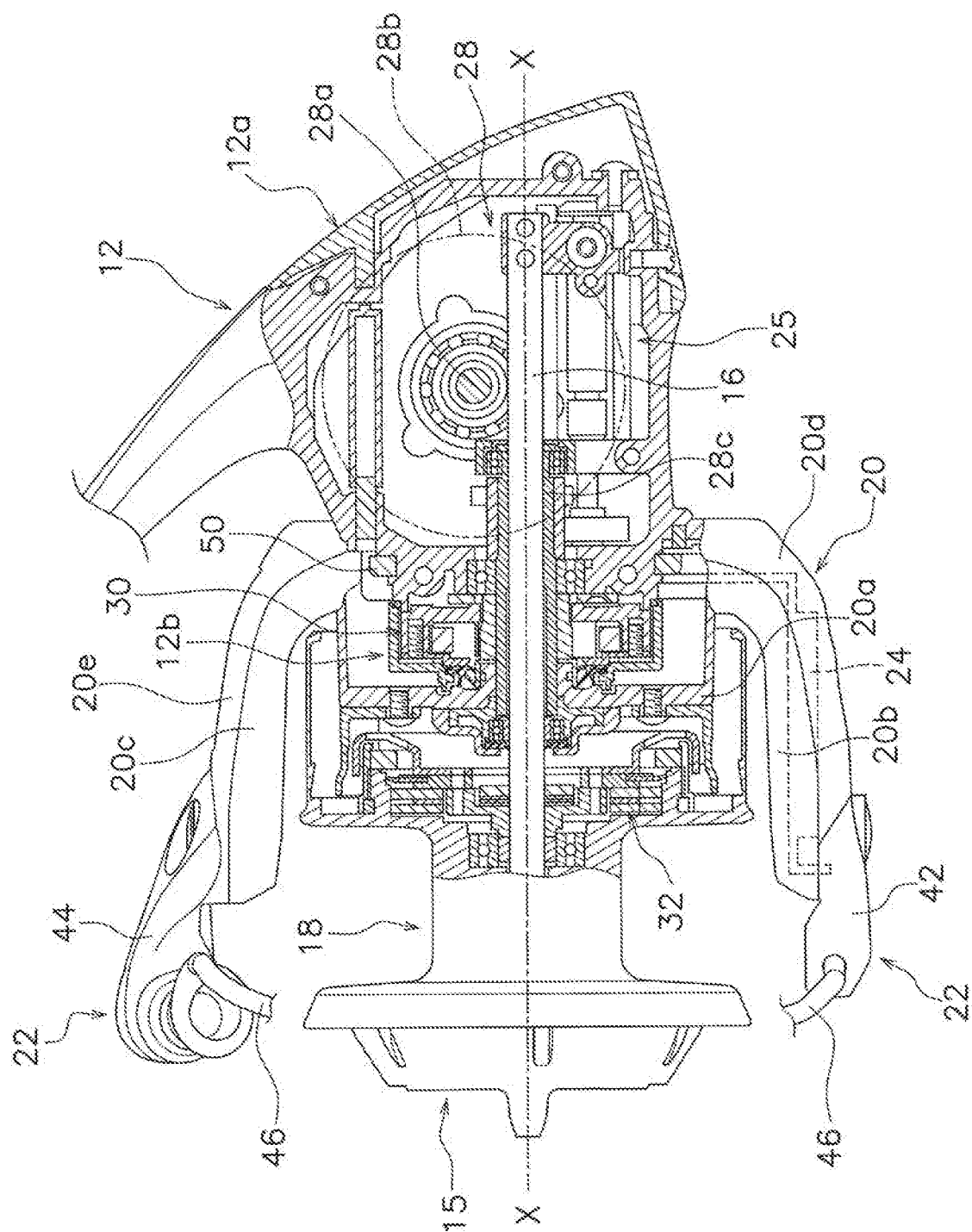
FIG. 2 is a partial cross-sectional view of FIG. 1.

As shown in FIG. 1, a spinning reel 10 employing one embodiment of the present invention comprises a reel body 12, a rotor 20, a bail arm 22, and a bail reversing mechanism 24 (refer to FIG. 2).

Specifically, the spinning reel 10 comprises the reel body 12, a handle 14, a spool shaft 16 (refer to FIG. 2), a spool 18, the rotor 20, the bail arm 22, and the bail reversing mechanism 24 (refer to FIG. 2).

As shown in FIG. 2, the axis of the spool shaft 16 is referred to as the X axis. The direction in which the X axis extends as well as the direction along the X axis is referred to as the axial direction. The direction around the X axis, centered on the X axis, is referred to as the rotational direction (circumferential direction). The direction away from the X axis centered on the X axis is referred to as the radial direction. In addition, in the axial direction, the direction in which a fishing line is cast (unreeled) is referred to as the "front," and the direction opposite to the "front" is referred to as the "rear."

As illustrated in FIG. 2, the reel body 12 has a reel body portion 12a and a cylindrical portion 12b. The reel body portion 12a has an internal space. An oscillating mechanism 25 for moving the spool 18 in the longitudinal direction is disposed in the internal space.

In addition, a portion of the rotor drive mechanism 28 for driving the rotor 20 is disposed in the internal space. A switching member 40 is provided in the front portion of the reel body portion 12a. The switching member 40 is formed with an essentially annular shape. A plurality of recesses 50a are formed on the outer peripheral portion of the switching member 40 (refer to FIG. 6).

In addition, the cylindrical portion 12b is disposed on the front portion of the reel body portion 12a. An anti-reverse rotation mechanism 30 is disposed in the cylindrical portion 12b. The oscillating mechanism 25 and the anti-reverse rotation mechanism 30 have essentially the same configurations as the conventional configurations, so that their descriptions have been omitted.

As shown in FIG. 1, the handle 14 is rotatably supported by the reel body 12. The present embodiment illustrates an example in which the handle 14 is disposed on the left side of the reel body, but the handle 14 may be disposed on the right side of the reel body 12.

As shown in FIG. 2, the spool shaft 16 is supported by the reel body 12. The spool shaft 16 extends in the longitudinal direction and can be moved in reciprocating fashion in the longitudinal direction with respect to the reel body 12 by the oscillating mechanism 25.

The fishing line is wound around the spool 18. The spool 18 is configured to be movable integrally with the spool shaft 16 in the axial direction. For example, the spool 18 is mounted on the spool shaft 16 via a drag operating unit 15 that is screwed onto the distal end portion of the spool shaft 16.

As a result, when the spool shaft 16 moves in reciprocating fashion in the longitudinal direction with respect to the reel body 12, as described above, the spool 18 also moves in reciprocating fashion in the longitudinal direction with respect to the reel body 12. FIG. 2 shows an example in which the spool 18 has moved to the rearmost position with respect to the reel body 12.

In addition, the spool 18 is configured to be rotatable relative to the spool shaft 16. For example, a drag mechanism 32 is disposed on the radially inward side of the spool 18. The spool 18 is connected to be rotatable relative to the spool shaft 16 via the drag mechanism 32.

The rotor 20 is used for winding the fishing line about the spool 18. The rotor 20 is configured to be rotatable with respect to the reel body 12, and is rotated in the circumferential direction, for example, in the line-winding direction, via the rotor drive mechanism 28.

The rotor drive mechanism 28 includes a drive shaft 28a that rotates in conjunction with the rotation of the handle 14, a drive gear 28b disposed on the drive shaft 28a, and a pinion gear 28c that meshes with the drive gear 28b. The pinion gear 28c is formed in a tubular shape. The spool shaft 16 is inserted through the inner peripheral portion of the pinion gear 28c.

For example, the rotor 20 has an X axis of rotation that is coaxial with the axis of the spool shaft 16. The rotor 20 is disposed on the reel body 12 to be rotatable relative to the reel body 12 about the X axis of rotation.

The rotor 20 is coupled to the pinion gear 28c to be integrally rotatable. The rotor 20 has a tubular portion 20a that is connected to the pinion gear 28c, and a first rotor arm 20b and a second rotor arm 20c that are integrally formed with the tubular portion 20a. The rotor 20 also includes a first cover member 20d and a second cover member 20e.

The first rotor arm 20b extends forward from the rear-end portion of the tubular portion 20a and is spaced apart from the tubular portion 20a. The first rotor arm 20b has a guide groove 20f (refer to FIG. 3). The guide groove 20f is a groove that extends in the axial direction and that is open in the radial direction. The guide groove 20f is integrally formed with the first rotor arm 20b. An engagement member 34 (described further below) is disposed in the guide groove 20f.

The second rotor arm 20c is disposed facing the first rotor arm 20b. The second rotor arm 20c extends forward from a rear-end portion of the tubular portion 20a and is spaced apart from the tubular portion 20a.

The first cover member 20d covers the outside surface of the first rotor arm 20b in the radial direction.

The second cover member 20e covers the outside surface of the second rotor arm 20c in the radial direction.

The rotation of the rotor 20 in the casting direction (reverse rotation) is prevented by the anti-reverse rotation mechanism 30 disposed between the reel body 12 and the rotor 20. In the present embodiment, the anti-reverse rotation mechanism 30 can be switched between a reverse rotation prevention state for preventing the rotation in the casting direction and a reverse rotation enabling state for enabling the rotation in the line-winding direction (reverse rotation).

Bail Arm

The bail arm 22 is pivotable with respect to the rotor 20. For example, as shown in FIG. 2, the bail arm 22 is mounted on the distal end portion of the first rotor arm 20b and the second rotor arm 20c that extends in a forward direction. In this embodiment, the attitude of the bail arm 22 can be changed between the line-winding attitude, in which the fishing line can be wound around the spool 18, and the casting attitude, in which the fishing line can be cast or unreeled from the spool 18.

The bail arm 22 comprises a first bail support member 42, a second bail support member 44, and a bail 46 that connects the first bail support member 42 and the second bail support member 44.

The first bail support member 42 is mounted on the distal end portion of the first rotor arm 20b to be pivotable with respect to the first rotor arm 20b. The second bail support member 44 is mounted on the distal end portion of the second rotor arm 20c to be pivotable with respect to the second rotor arm 20c.

Figure 4:
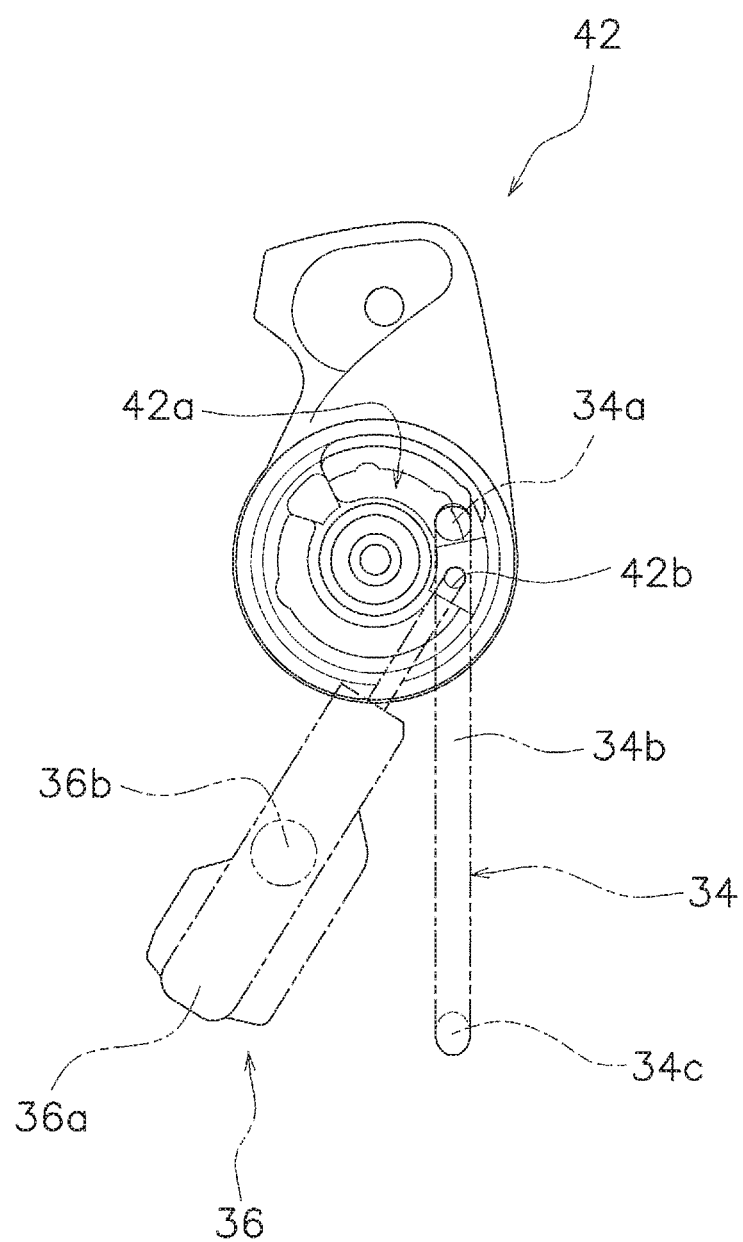
FIG. 4 is a view of a first bail support member as viewed from the inside in the radial direction.

As shown in FIG. 4, the first bail support member 42 has an engagement recess 42a and an engagement hole 42b. The engagement recess 42a and the engagement hole 42b are formed on a portion of the first bail support member 42 opposing the first rotor arm 20b, such as on a surface of the first bail support member 42 opposing the first rotor arm 20b.

The engagement recess 42a is a recess with which the engagement member 34 engages. A distal end portion 34a (described further below) of the engagement member 34 engages the engagement recess 42a. The engagement recess 42a is a groove that extends in the circumferential direction. The engagement hole 42b is a hole with which a rod 51 (described further below) engages. A distal end portion of the rod 51, such as an engagement portion 51a (described further below), is inserted into the engagement hole 42b.

Bail Reversing Mechanism

The bail reversing mechanism 24 switches the bail arm 22 from the casting attitude to the line-winding attitude in conjunction with the rotation of the rotor 20. For example, when the rotor 20 rotates in the line-winding direction, the bail reversing mechanism 24 switches the attitude of the bail arm 22 from the casting attitude to the line-winding attitude. In addition, the bail reversing mechanism 24 holds each of the casting attitude and the line-winding attitude.

As shown in FIG. 2, the bail reversing mechanism 24 is disposed inside the bail arm 22. For example, the bail reversing mechanism 24 is disposed between the first rotor arm 20b and the first cover member 20d.

Figure 3:
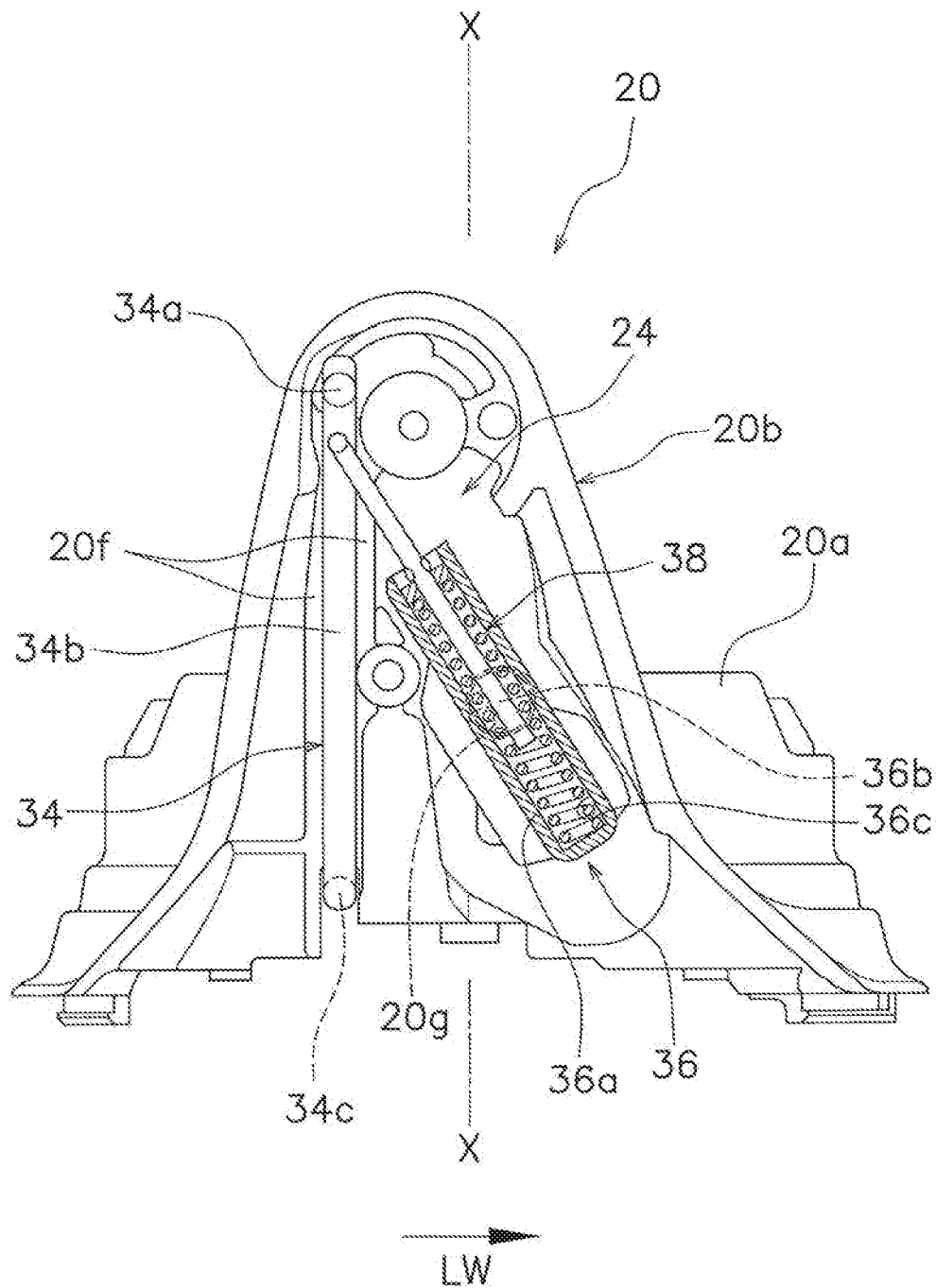
FIG. 3 is a view of a rotor and a bail reversing mechanism as viewed from the outside in the radial direction.

As shown in FIG. 3, the bail reversing mechanism 24 has a swing member 36 (one example of the housing part), and a toggle unit 38 (one example of the pressing part, the biasing part, and the guide part). Specifically, the bail reversing mechanism 24 has the engagement member 34, the swing member 36 (one example of the housing part), the toggle unit 38 (one example of the pressing part, the biasing part, and the guide part), and the switching member 40 (refer to FIG. 6).

Although FIG. 3 is a side view, the bail reversing mechanism 24 is shown in FIG. 3 in a partial cross-sectional view for ease of explanation.

Engagement Member

The engagement member 34 is disposed in the rotor 20. For example, the engagement member 34 is disposed in the rotor 20 so as to be movable in the axial direction with respect to the first rotor arm 20b. For example, as shown in FIG. 3, the engagement member 34 is disposed in the guide groove 20f of the first rotor arm 20b and is guided in the axial direction by the guide groove 20f.

The engagement member 34 moves in the axial direction in accordance with the swinging of the bail arm 22. For example, when the bail arm 22 is in the line-winding attitude, the engagement member 34 is disposed in the position of FIG. 3. When the bail arm 22 is in the casting attitude, the engagement member 34 moves downward from the position of FIG. 3 along the guide groove 20f.

The engagement member 34 is a metallic linear member. Two end portions of the engagement member 34 are bent in different directions. As shown in FIG. 3, the distal end portion 34a of the engagement member 34 is bent radially outward in the engagement member 34. The distal end portion 34a engages the bail arm 22, for example, the engagement recess 42a of the first bail support member 42.

As shown in FIG. 3, an intermediate portion 34b of the engagement member 34 is the portion between the distal end portion 34a and a rear-end portion 34c. The intermediate portion 34b is disposed in the guide groove 20f. The intermediate portion 34b can be guided in the axial direction by the guide groove 20f.

Figure 6:
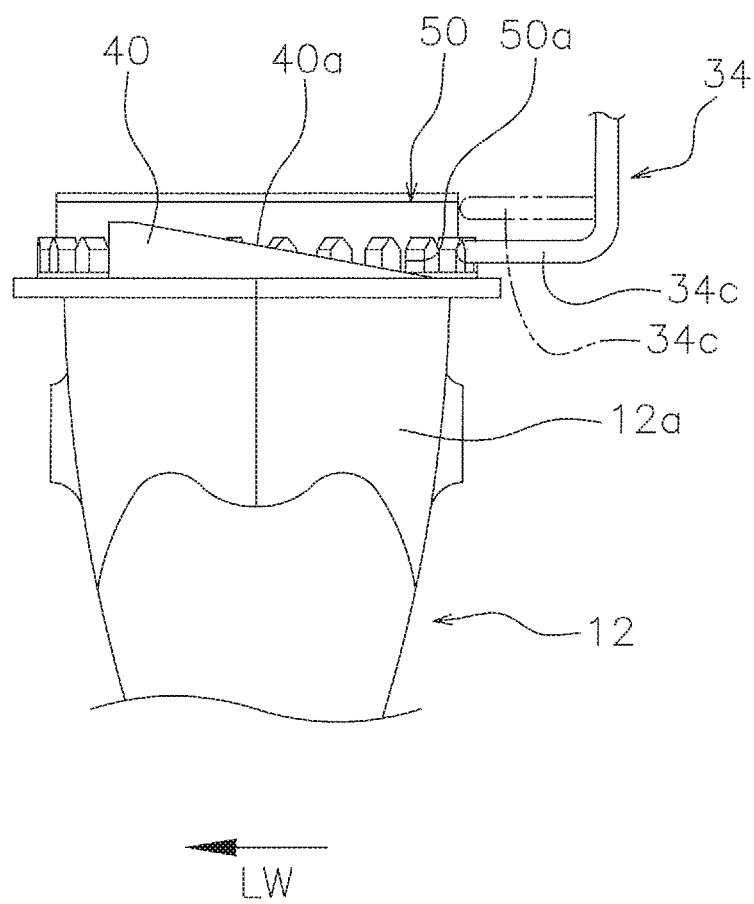
FIG. 6 is an enlarged view of a switching member as viewed from the outside in the radial direction.

The rear-end portion 34c of the engagement member 34 is a part that is bent radially inward. The rear-end portion 34c is bent radially inward. Here, when the bail arm 22 is in the line-winding attitude, as shown in FIG. 6, the rear-end portion 34c engages a recess 50a of the switching member 40. When the bail arm 22 is in the casting attitude, the engagement member 34 is disposed in the position of the solid line in FIG. 6, for example, below the position of the broken line in FIG. 6 (position in FIG. 3). In this state, the rear-end portion 34c can contact the switching member 40.

Swing Member

The swing member 36 is disposed in the rotor 20. For example, as shown in FIG. 3, the swing member 36 is pivotably attached to the first rotor arm 20b between the first rotor arm 20b and the first cover member 20d.

Figure 5:
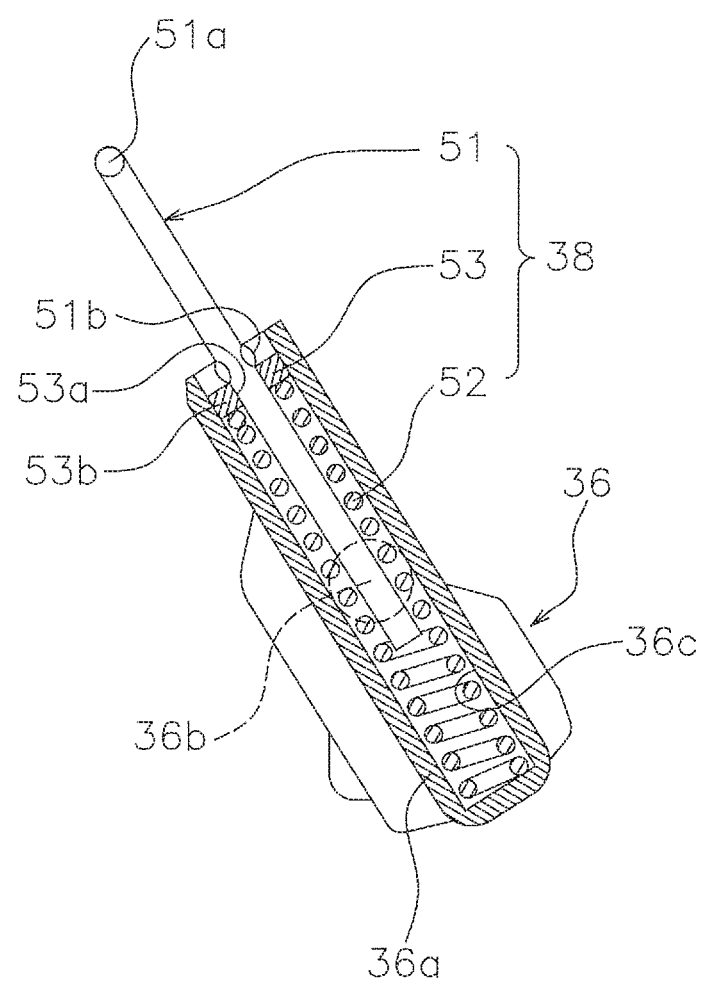
FIG. 5 is an enlarged view of the bail reversing mechanism as viewed from the outside in the radial direction.

As shown in FIGS. 3 and 5, the toggle unit 38 is housed in the swing member 36. For example, as shown in FIG. 5, a coil spring 52 is disposed in the swing member 36. More specifically, the rod 51, the coil spring 52, and a guide member 53 are disposed in the swing member 36.

The swing member 36 has a body portion 36a and a projection 36b. The body portion 36a has a housing hole 36c. Specifically, the body portion has a housing hole 36c that is elongated in one direction. As shown in FIG. 5, the coil spring 52 is housed in the housing hole 36c. Specifically, the rod 51, the coil spring 52, and the guide member 53 are disposed in the housing hole 36c.

The projection 36b is disposed on the body portion 36a. For example, the projection 36b projects from the outer circumferential surface of the body portion 36a toward the first rotor arm 20b. The projection 36b is formed with an essentially cylindrical shape. The projection 36b is disposed in a tubular recess 20g disposed in the first rotor arm 20b (refer to FIG. 3).

In this manner, by disposing the projection 36b in the tubular recess 20g of the first rotor arm 20b, the body portion 36a is pivotably attached to the first rotor arm 20b. That is, the swing member 36 is pivotably attached to the first rotor arm 20b.

Toggle Unit

The toggle unit 38 biases the bail arm 22 into either the line-winding attitude or the casting attitude, which are on either side of a dead point. In addition, the toggle unit 38 holds the bail arm 22 in the line-winding attitude and the casting attitude.

As shown in FIG. 5, the toggle unit 38 includes the rod 51 (one example of a pressing part), the coil spring 52 (one example of a biasing part), and the guide member 53 (one example of a guide part).

The rod 51 is configured to be capable of pressing the bail arm 22 so as to swing the bail arm 22. The rod 51 is disposed in the swing member 36. Specifically, a portion of the rod 51 is disposed in the hole 36c of the swing member 36.

In addition, the rod 51 is disposed on the inner peripheral portion of the coil spring 52. Specifically, a portion of the rod 51 is disposed on the inner peripheral portion of the coil spring 52. More specifically, a portion of the rod 51 is disposed on the inner peripheral portion of the coil spring 52 via a guide hole 53a (described further below) of the guide member 53.

The rod 51 has a locking portion 51a and a locking projection 51b (one example of a pressed portion). The locking portion 51a is a part that is bent toward the first bail support member 42. The distal end of the locking portion 51a engages with the engagement hole 42b of the first bail support member 42 (refer to FIG. 4).

The locking projection 51b is integrally formed with the rod 51. At least a portion of the locking projection 51b is disposed in the swing member 36. In FIG. 5, the locking projection 51b is disposed inside the swing member 36. The locking projection 51b is pressed by the coil spring 52 via the guide member 53. As a result, force can be evenly transmitted to the rod 51 from the distal end portion of the coil spring 52.

The coil spring 52 biases the rod 51. The coil spring 52 is housed in the swing member 36. The coil spring 52 is disposed in the housing hole 36c of the swing member 36. Bending, falling, etc., of the coil spring 52 can be restricted by the inner circumferential surface of the housing hole 36c of the swing member 36. The coil spring 52 can thereby stably expand and contract along the inner circumferential surface of the housing hole 36c of the swing member 36.

The guide member 53 operates the coil spring 52 between the rod 51 and the swing member 36. The guide member 53 is disposed between the coil spring 52 and the rod 51. Specifically, the guide member 53 is disposed between the coil spring 52 and the locking projection 51b of the rod 51.

The guide member 53 is housed in the swing member 36. The guide member 53 is disposed in the swing member 36 so as to be capable of contacting the inner circumferential surface of the housing hole 36c of the swing member 36.

The guide member 53 is formed with an essentially annular shape. The guide member 53 has the guide hole 53a and a sliding portion 53b. The guide hole 53a penetrates the guide member 53. The rod 51 is inserted in the guide hole 53a. The sliding portion 53b forms the outer circumferential surface of the guide member 53. The sliding portion 53b contacts the inner circumferential surface of the housing hole 36c of the swing member 36. When the coil spring 52 expands and contracts, the sliding portion 53b swings and slides with respect to the inner circumferential surface of the housing hole 36c of the swing member 36. It is thereby possible to stabilize the attitude of the rod 51 such that the rod 51 does not slide against or contact the inner circumferential surface of the housing hole 36c of the swing member 36.

Switching Member

As shown in FIGS. 2 and 6, the switching member 40 is disposed on the reel body 12. The switching member 40 switches the attitude of the bail arm 22 via the engagement member 34 by contact with the engagement member 34.

When the bail arm 22 (first bail support member 42) is in the casting attitude, as shown in FIG. 6, the engagement member 34 is disposed in the position of the solid line in FIG. 6 (below the position in FIG. 3).

In this state, if the rotor 20 rotates in the line-winding direction LW, the engagement member 34 is guided by the switching member 40.

For example, an inclined surface 40a is disposed on the switching member 40. The rear-end portion 34c of the engagement member 34 is guided by the inclined surface 40a. As a result, the attitude of the bail arm 22 (first bail support member 42) is switched from the casting attitude to the line-winding attitude.

Specifically, when the rotor 20 rotates in the line-winding direction LW, the inclined surface 40a contacts the rear-end portion 34c of the engagement member 34 and moves the engagement member 34 until the toggle unit 38 exceeds the dead point. In this embodiment, the swing member 36 swings with respect to the first rotor arm 20b.

Here, when the rod 51 exceeds the dead point, the first bail support member 42 is rotated by the biasing force of the coil spring 52. Then, the distal end portion 34a of the engagement member 34 contacts the circumferential end of the engagement recess 42a at the position shown in FIG. 4. The first bail support member 42 is positioned by this contact. In this state, the engagement member 34 has returned to the position of the broken line in FIG. 6, that is, the position shown in FIGS. 3 and 4.

By rotating the first bail support member 42 in this manner, the bail arm 22 returns from the casting attitude to the line-winding attitude.

In the spinning reel 10 described above, the coil spring 52 is disposed in the swing member 36, and the guide member 53 is housed in the swing member 36. In this state, the guide member 53 guides the expanding/contracting coil spring 52 between the engagement member 34 and the swing member 36 along the inner circumferential surface of the housing hole 36c of the swing member 36.

In this manner, since the coil spring 52 is housed inside the swing member 36 and guided by the guide member 53 between the rod 51 and the swing member 36, it is possible to prevent the coil spring 52 from sliding against or contacting the open end of the swing member 36, and to reduce changes in the sliding resistance or the contact resistance. That is, the attitude of the bail arm 22 can be smoothly changed.

Other Embodiments

One embodiment of the present invention was described above, but the present invention is not limited to the above-described embodiment, and various modifications can be made without departing from the scope of the invention. In particular, the various embodiments and modified examples described herein can be arbitrarily combined as required.

In the embodiment described above, the rotor 20 is rotatable in the line-winding direction and the casting direction, but the rotor 20 may be configured to be rotatable only in the line-winding direction. In this embodiment, the anti-reverse rotation mechanism 30 always prevents the rotation of the rotor 20 in the casting direction.

In the embodiment described above, a description is presented in which a front drag spinning reel 10 is an example, but the present invention may be applied to other spinning reels as long as the spinning reel has a bail reversing mechanism 24. For example, the present invention can be applied to all spinning reels including a rear drag type spinning reel and a lever brake type spinning reel that can brake the rotor 20 with a lever member.

What is claimed is:
1. A spinning reel, comprising:
a reel body;
a rotor configured to be rotatable relative to the reel body;
a bail arm configured to be pivotable with respect to the rotor; and a bail reversing mechanism having a pressing part configured to be capable of pressing the bail arm to swing the bail arm, a biasing part configured to bias the pressing part, a housing part disposed in the rotor and housing the biasing part, and a guide part housed in the housing part and configured to guide the biasing part between the pressing part and the housing part.

2. The spinning reel according to claim 1, wherein
the housing part has a housing hole configured to have the biasing part disposed therein, and
the guide part has a sliding portion configured to slide along the housing hole.

3. The spinning reel according to claim 1, wherein
the pressing part has a pressed portion configured to be pressed by the biasing part via the guide part, and
at least a portion of the pressed portion is disposed in the housing part.

4. The spinning reel according to claim 1, wherein
the biasing part is a coil spring,
the guide part has a guide hole through which the pressing part is configured to be inserted, and
a portion of the pressing part is disposed in an inner peripheral portion of the coil spring via the guide hole.

\* \* \* \* \*